Aug. 25, 1964 H. F. DAVIS 3,146,401
SYSTEM WITH PLURAL INPUTS HAVING FEEDBACK MEANS
FOR PREVENTING INTERACTION BETWEEN SAID INPUTS
Filed May 10, 1962 3 Sheets-Sheet 1

INVENTOR.
HENRY F. DAVIS
BY
ATTORNEY.

FIG. 3

*INVENTOR.*
HENRY F. DAVIS

BY *Arthur H. Swanson*

ATTORNEY.

United States Patent Office 3,146,401
Patented Aug. 25, 1964

3,146,401
SYSTEM WITH PLURAL INPUTS HAVING FEEDBACK MEANS FOR PREVENTING INTERACTION BETWEEN SAID INPUTS
Henry F. Davis, Worcester, Pa., assignor to Minneapolis-Honeywell Regulator Company, Minneapolis, Minn., a corporation of Delaware
Filed May 10, 1962, Ser. No. 193,751
7 Claims. (Cl. 328—147)

This invention relates to electrical apparatus, and more particularly to electrical control means.

In the art relating to industrial process controls, it is usual to detect a particular condition in the process, known as a process variable, and control some phase of the process on a signal derived from the variable. However, there are circumstances where several variables are involved; where the controlling action may be shifted from being responsive to the signals derived from one of the variables to being responsive to the signal derived from any other one of the variables; where the shift in control action takes place automatically as a result of a change in the relationship between the several variables. While, generally, apparatus has been provided in the past for accomplishing this result, even where the control elements featured reset action, these devices have been in the form of pneumatic systems or electronic tube systems where the reset action presented no particularly difficult problems. However, with the advent of newer, more sophisticated controllers, the problem of feedback to control the reset action becomes more complex.

Accordingly, it is an object of the present invention to provide an improved control system characterized in an automatic selection between a plurality of input control signals.

It is a further object of this invention to provide an improved control system as set forth wherein reset difficulties in the several controller means are avoided.

It is a still further object of this invention to provide an improved control system as set forth wherein means are provided for supplying a feedback signal to each of the several input means without introducing undesirable interaction between the several input means.

In accomplishing these and other objects, there has been provided, in accordance with the present invention, a control system for providing a control signal representative of a selected one of a plurality of input signals. All of the signals from a plurality of input devices are applied simultaneously to a selecting network. The selecting network may be arranged to select either the lowest input signal or the highest. The selected signal is fed through a signal sampling circuit and a utilization device such as a valve actuator. The sampled signal is representative of the existing condition of the utilization device and is applied to a suitable signal chopper. The chopped signal is applied, through a suitable network, to the primary winding of a transformer. The transformer is provided with a plurality of substantially identical but conductively isolated secondary windings. These windings provide substantially identical feedback signals to each of the input devices.

A better understanding of this invention may be had from the following detailed description when read in connection with the accompanying drawings, in which:

FIG. 3 is a schematic circuit diagram showing details of a circuit embodying the present invention in a somewhat different form.

Figure 1:
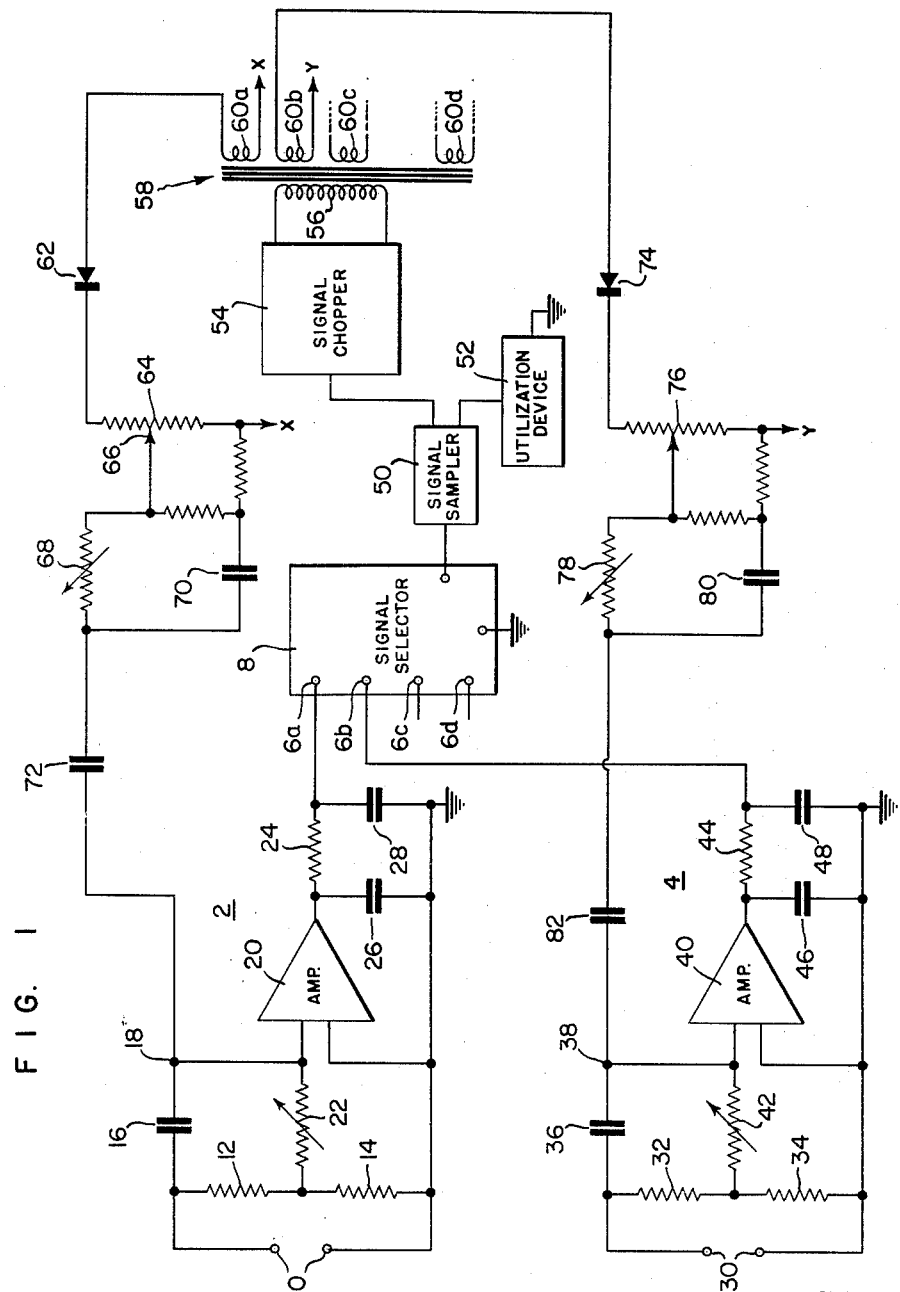
FIG. 1 is a schematic block diagram of a selective control system embodying the present invention.

Referring now to the drawings in more detail, there is shown in FIG. 1 a first input signal responsive circuit 2 and a second substantially identical input signal responsive circuit 4. These two input signal responsive circuits are representative of a plurality of such circuits, each of which is connected to a separate one of the input terminal 6a–d on a signal selector 8. The input signal responsive circuits 2 and 4 are each in the form generally designated as a controller and are of the type for producing a characterized output current signal which is a predetermined function of an input voltage signal. Thus, there is provided for the controller 2 a pair of input terminals 10 which may be connected to suitable signal producing means (not shown). Such a signal producing means may include a process condition responsive transducer for producing a signal corresponding to an existing condition in some phase of a process. Such signal may be compared against a desired reference signal to produce a difference or error signal. The difference or error signal would be, then, the voltage signal applied to the input terminals 10. Across the terminals 10 there is connected a pair of resistors 12 and 14 in series. Also connected to the upper one of the input terminals 10, there is an input capacitor 16, the other side of which is connected to a summing junction 18. The junction 18 is connected directly to one of the input terminals of a suitable amplifier 20. The other of the input terminals 10 is connected to the other of the input terminals of the amplifier 20. A variable resistor 22 is connected, at one end, to the junction between the two resistors 12 and 14, and, at the other end, to the junction 18. The output of the amplifier 20 is applied, through a smoothing filter including a resistor 24, and a pair of capacitors 26 and 28, to the first of the input terminals 6a of the signal selector 8.

Similarly, the input signal responsive circuit 4 includes a pair of input terminals 30 which may also be connected to a suitable voltage signal producing means. Across the terminal 30 there is connected a pair of resistors 32 and 34 in series. An input capacitor 36 is connected between the upper one of the input terminals 30 and a summing junction 38. The junction 38 is connected directly to one of the input terminals of an amplifier 40. A variable resistor 42 is connected, at one end, to the junction between the two serially connected resistors 32 and 34, and, at the other end, to the summing junction 38. The output of the amplifier 40 is applied, through a smoothing filter including a resistor 4 and a pair of capacitors 46 and 48, to the second one of the input terminals 6b of the signal selector 8.

In a similar manner, other input signal responsive circuits may be connected to the others of the input terminals of the signal selector 8. In a manner to be hereinafter described, the selector 8 selects a single one of the several input signals, and transmits a signal corresponding thereto to a signal sampler means 50. The signal from the signal selector 8 passes through the sampler means 50 to an ultimate utilization device 52 which may be a control valve, a pump control, an electrical energy supply control means, or some other element of control for the process.

At the sampler 50, the control signal is sampled and the sampled signal is applied to the input of a signal chopper 54 where the control signal is converted to an alternating signal of a predetermined frequency. The output of the chopper 54 is connected to the primary winding 56 of a transformer 58. The transformer 58 is provided with a plurality of substantially identical but electrically separate secondary windings 60a–d. Preferably, these secondary windings correspond in number to the number of input circuits connected to the signal selector 8. One terminal of each of the secondaries is connected, through a suitable impedance network, in feedback relation with corresponding ones of the input signal responsive circuits. Specifically, the one terminal of the first secondary winding 60a is connected in negative feedback relation with the first input signal responsive circuit 2. This connection includes a rectifying diode 62 connected to the first winding 60a. A proportional-band slidewire resistor 64 is connected between the diode 62 and the other terminal of the winding 60a as indicated by the reference X. A slider 66 on the slidewire 64 picks off a predetermined portion of the signal and applies it to a rate circuit including a variable series resistor 68 and a shunt capacitor 70. The rate circuit is connected through a feedback or reset capacitor 72 to the summing junction 18.

Similarly, the one terminal of the second one of the windings 60b is connected, through a rectifying diode 74, a proportional band slidewire 76, a rate circuit including a variable resistor 78 and a capacitor 80 and a feedback or reset capacitor 82, to the summing junction 38. The other terminal of the winding 60b is connected to the bottom of the slidewire 76 as indicated by the reference Y. In a similar manner, the other secondaries are connected to other input signal responsive circuits.

Figure 2:
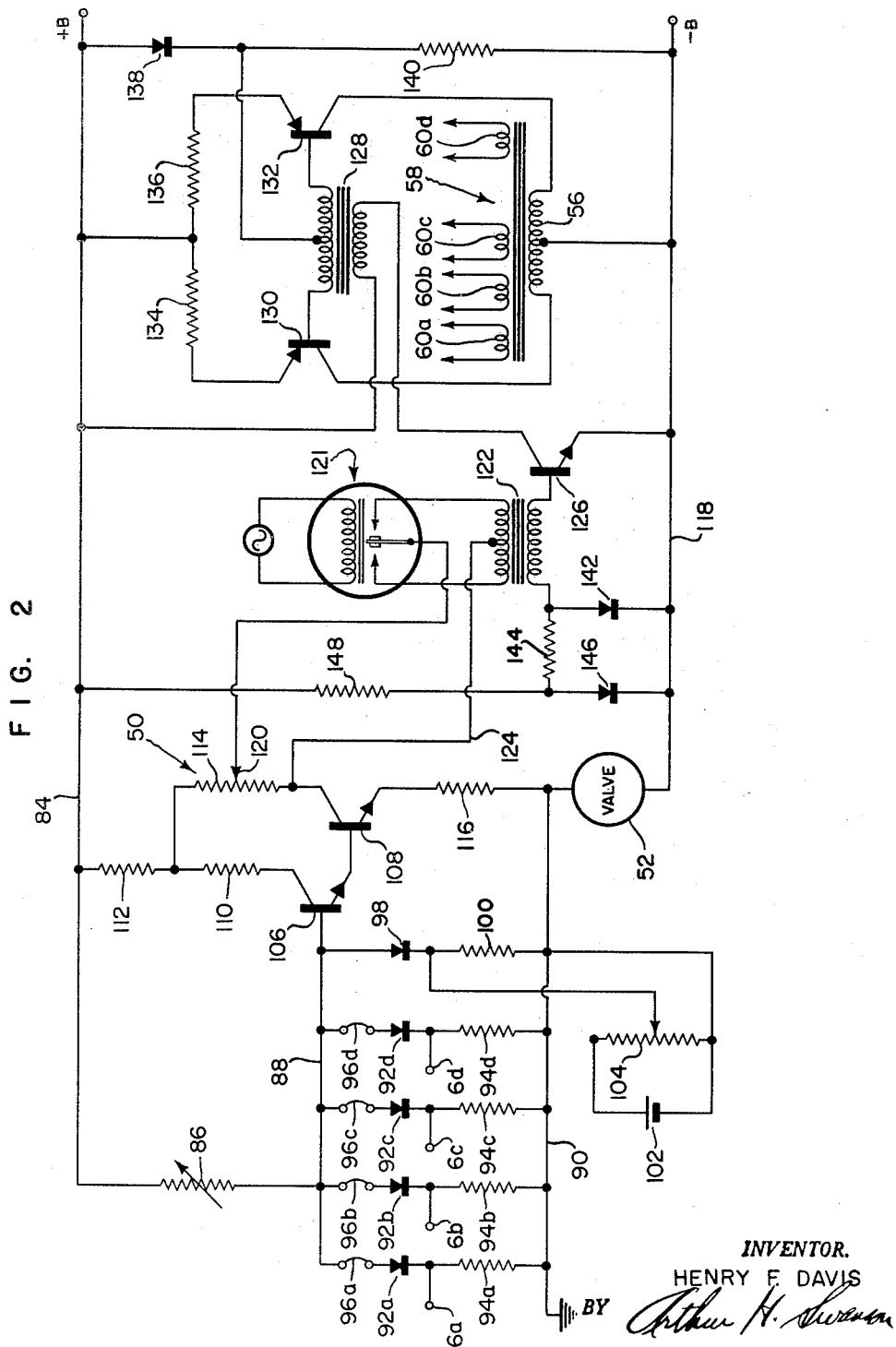
FIG. 2 is a schematic circuit diagram showing details of a circuit embodying the present invention in one form.

In FIG. 2, there is shown details of the circuitry involved in one embodiment of this invention including the signal selector 8, the signal sampler 50, and the chopper 54. In this illustration, there are shown four separate input terminals 6a–d for the selector. From a positive voltage line 84, connected to a regulated power supply (not shown), there is connected a variable series bias resistor 86 connected to a first common lead 88. Between the first common lead 88 and a second common lead 90 there is connected a plurality of input signal selector circuits, four such circuits being shown. The first such circuit includes a diode 92a and a resistor 94a connected in series between the two common leads. The input terminal 6a is connected to the junction between the diode 92a and the resistor 94a. A second such circuit includes a diode 92b and a resistor 94b connected in series between the two common leads and with the second input terminal 6b connected to the junction between the diode 92b and the resistor 94b. Similarly, the third and fourth circuits include the diodes 92c and 92d, respectively, and the series connected resistors 94c and 94d with the input terminals 6c and 6d similarly connected. In series with each of the input signal selector circuits is a removable jumper 96a–d, respectively. The purpose of these jumpers will appear later herein. Also connected between the two common leads 88 and 90, is a signal limiting circuit which is similar in configuration to the input signal selector circuits. This circuit also includes a diode 98 and a series resistor 100. To the junction between the diode 98 and the resistor 100, there is connected a reference signal input means. A reference signal is obtained from a voltage source represented by a battery 102 and a slidewire 104 connected across the terminals of the battery.

The first common lead 88, is connected to the base electrode of a first transistor 106. The emitter of the transistor 106 is connected directly to the base electrode of a second transistor 108. The collector of the first transistor 106 is connected, through a first resistor 110 and a second resistor 112, to the positive voltage supply lead 84. Similarly, the collector of the second transistor 108 is connected, through a resistor 114 and the resistor 112, to the lead 84. The emitter of the second transistor 108 is connected through a resistor 116 to the second common lead 90, thence, through the utilization device represented by the valve actuator 52 and a negative voltage supply line 118, to the negative terminal of the regulated voltage supply. Thus, the transistors 106 and 108 constitute an amplifier of the selected input signal for the control of the current applied to the output device.

The resistor 114 in the collector circuit of the second transistor 108 is in the form of a slidewire resistor. A slider 120, associated with the slidewire 114 to form the signal sampler 50, is connected to the movable blade of the signal converter 121. Here, the chopper includes a mechanical interrupter type of signal converter. The fixed contacts of the converter 121 are connected, respectively, to opposite ends of the primary winding of a transformer 122. The primary winding of the transformer is provided with a center tap which is connected, by a lead 124 to the collector end of the slidewire resistor 114. Thus, the signal developed between the lead 124 and the slider 120, which signal is proportional to the current flowing through the utilization device 52, is applied alternately to the opposite halves of the primary winding of the transformer 122. The transformer 122 is provided with a secondary winding which is connected, at one end, to the base electrode of a transistor 126. The emitter of the transistor 126 is connected directly to the negative voltage line 118. The collector of the transistor 126 is connected, through a primary winding on a transformer 128, to the positive voltage supply line 84. The opposite end of the secondary of the transformer 122 is connected, through a diode 142, to the negative voltage line 118. It is also connected, through a resistor 144, to the junction between a diode 146 and a resistor 148 serially connected between the positive and negative voltage lines 84 and 118 to provide a bias source for the base of the transistor 126.

The transformer 128 is included in a controlled transistor gate circuit. The secondary winding of the transformer 128 has its opposite ends connected, respectively, to the base electrodes of a pair of transistors 130 and 132. The emitter of the transistor 130 is connected, through a resistor 134 to the positive voltage line 84. Similarly, the emitter of the transistor 132 is connected, through a resistor 136, to the positive voltage line 84. The collectors of the two transistors 130 and 132 are connected, respectively, to opposite ends of the primary winding 56 of the transformer 58. A center tap on the primary winding 56 is connected to the negative voltage line 118. The transformer 58 has a plurality of secondary windings 60a–d, as hereinbefore noted. A diode 138 and a resistor 140 are serially connected between the positive voltage line 84 and the negative voltage line 118 to provide a bias supply for the transistors 130 and 132. To this end, the junction between the diode 138 and the resistor 140 is connected to a center tap on the secondary winding of the transformer 128.

The operation of the system thus far described is as follows. Referring to the structure shown in FIG. 1, a signal representative of the condition of one process variable is applied to the input terminals 10 of the first input controller 2. There, the signal is characterized and amplified in the well known manner, then applied as input signal to the first input terminal 6a of the signal selector 8. Similarly, a signal representative of a different process variable is applied to the input terminals 30 of the second input controller 4. That signal is also characterized, amplified and applied to the second input terminal 6b of the signal selector 8. Other input signals may be similarly characterized and amplified and then applied as input signals to the others of the input terminals of the signal selector 8.

The signal selector 8 is so constituted that it selects the input signal which is least, and produces an output signal corresponding thereto. A better understanding of the operation of the signal selector 8 may be had by referring, for the moment, to FIG. 2. The variable resistor 86 together with the several selector circuits form a combination which is in the nature of a voltage divider between the positive voltage line 84 and the common lead 90 with the common lead 88 being at the intermediate or pickoff point of the divider network. Thus the resistor 86 forms one leg of the divider and the impedance of the resistors 94a–d and 100 forms the other leg. The resistors 94a–d and 100 are all of equal value. In the absence of a signal applied to any of the selector inputs, the lead 88 will be at that potential represented by the division between the impedance of the resistor 86 and the impedance of the resistors 94a–d and 100, assuming that the variable resistor 86 is adjusted to some predetermined value and remains at that value. The output signals from the several controllers applied as input signals to the corresponding input terminals 6a–d are controlled current signals. As these signals are applied to the several input terminals 6a–d, the diodes are poled to prevent the flow of current from the input terminals up to the common lead 88. Accordingly, all of the current from each controller flows through the associated one of the resistors 94a–d. That current flow produces a voltage drop across each of the resistors 94a–d which is proportional to the magnitude of the current through it. That voltage drop is arranged to be in the same direction as the voltage drop produced by the power supply voltage. In other words, the potential of the upper end of the resistors 94a–d are each raised by an amount proportional to the magnitude of the current signals applied thereto. With the impedance of the resistor 86 relatively fixed, once it has been properly adjusted, the potential of the lead 88 is determined by the effective impedance of the resistors 94a–d (ignoring resistor 100 for the moment). Since the diodes 92a–d are poled to prevent current signals from circulating from one selector circuit to the other, the selector circuit with the smallest signal applied thereto will determine the potential of the lead 88. If conditions in the process under control change so that a different one of the controllers produces the smaller signal, the potential on the lead 88 will then by determined by the selector circuit which is connected to that controller. At this point it may be noted that if the polarity of the diodes 92 are reversed and the upper resistor 86 and its voltage connection are removed, the signal selector 8 will select the largest or highest signal for application to the lead 88.

If one of the provided selector circuits is not needed and is not connected to a source of signals, that is one of the input terminals 6a–d is left open, that circuit would, if not corrected, always be the circuit with the smallest signal since it would have no applied signal. In order to avoid having such an unused selector circuit form taking over control of the system, each of the circuits is provided with a removable jumper 96a–d. If one of the jumpers is removed, the selector circuit associated therewith is removed from the system. If all of the signals applied to the several input terminals 6a–d are larger than a predetermined desired maximum or safe level, damage might result if this situation were not corrected. To accomplish such a correction, the diode 98 and the resistor 100 are connected as if they constituted another selector circuit. A predetermined signal derived from the source 102 is applied to the junction between the diode 98 and the resistor 100. If all of the regular input signals are of a magnitude which is greater than the fixed signal on this circuit, then this latter circuit takes over and effectively limits the magnitude of the potential to which the lead 88 can be raised.

The signal that is thus determined by the selector circuits is applied, by the lead 88, to the input of the amplifier which includes the transistors 106 and 108. The signal applied to the base of the transistor 106 is amplified and applied to the base of the transistor 108. The current drawn from the power supply through the lines 84 and 118 is controlled by this excitation of the transistors 106 and 108. In series with that current flow path is the utilization device 52. Thus the smallest of the input signals controls the energization of the utilization device 52.

The signal sampler 50 in the collector circuit of the transistor 108 develops a signal which is proportional to the current drawn by the transistor 108, and hence is proportional to the controlling input signal. This signal is applied to the chopper where it is converted into an alternating signal having an amplitude proportional to the magnitude of the sampled signal. That alternating signal is amplified by the transistor 126 and applied to the primary winding of the transformer 128 as a control signal for the output converter or gate circuit.

In the output converter or gate circuit, the transistors 130 and 132 are normally biased off by the operation the bias signal developed by the diode 138 and resistor 140. The control signal applied to the primary winding of the transformer 128 produces an alternating signal on the secondary winding on the transformer. This signal biases the transistors 130 and 132 alternately into conduction. The extent of the conduction is determined by the amplitude of the alternating signal. The alternate operation of the transistors 130 and 132 produce a controlled alternating current signal in the primary winding 56 of the transformer 58. A corresponding alternating current signal is induced in each of the secondary windings 60a–d.

Now referring back to FIG. 1, it may be seen that the signals developed in the several secondary windings 60a–d are applied individually but simultaneously, after rectification, as feedback signals to each of the controller circuits. Thus the signal developed in the secondary 60a is rectified by the diode 62, passed through the characterizing network and applied to the junction 18 of the first controller. Similarly, the signal developed in the second winding 60b is rectified by the diode 74, passed through its associated characterizing network, and applied to the junction 38 of the second controller.

As noted hereinbefore, the amplifier 20 forming part of the first controller 2 and the amplifier 40 forming part of the second controller 4 may be high gain, very sensitive transistor amplifiers. The reset characterization network of the first controller 2 includes the capacitor 72, the resistors 22 and 14. The feedback signal from the first secondary winding 60a is applied to this reset network to characterize the operation of the controller in accordance with the magnitude and the time duration of the controlling signal. A substantially identical feedback signal is applied to the corresponding reset network of the second controller 4 from the second winding 60b. A similar feedback signal is applied to all of the other controllers which may be connected to the signal selector 8. In the controller which has active control of the system, the reset signal accomplishes the standard operation for reset. In all of the other controllers, since the feedback signal is representative of the operative condition of the utilization device 52, the feedback signal causes the other controllers to follow the operation of the system. Significantly, the several feedback signals are derived from conductively isolated means, the several discrete secondary windings 60a–d. This prevents interaction of the several controllers through the feedback circuits as would be the case with a conductively common feedback source.

Figure 3:
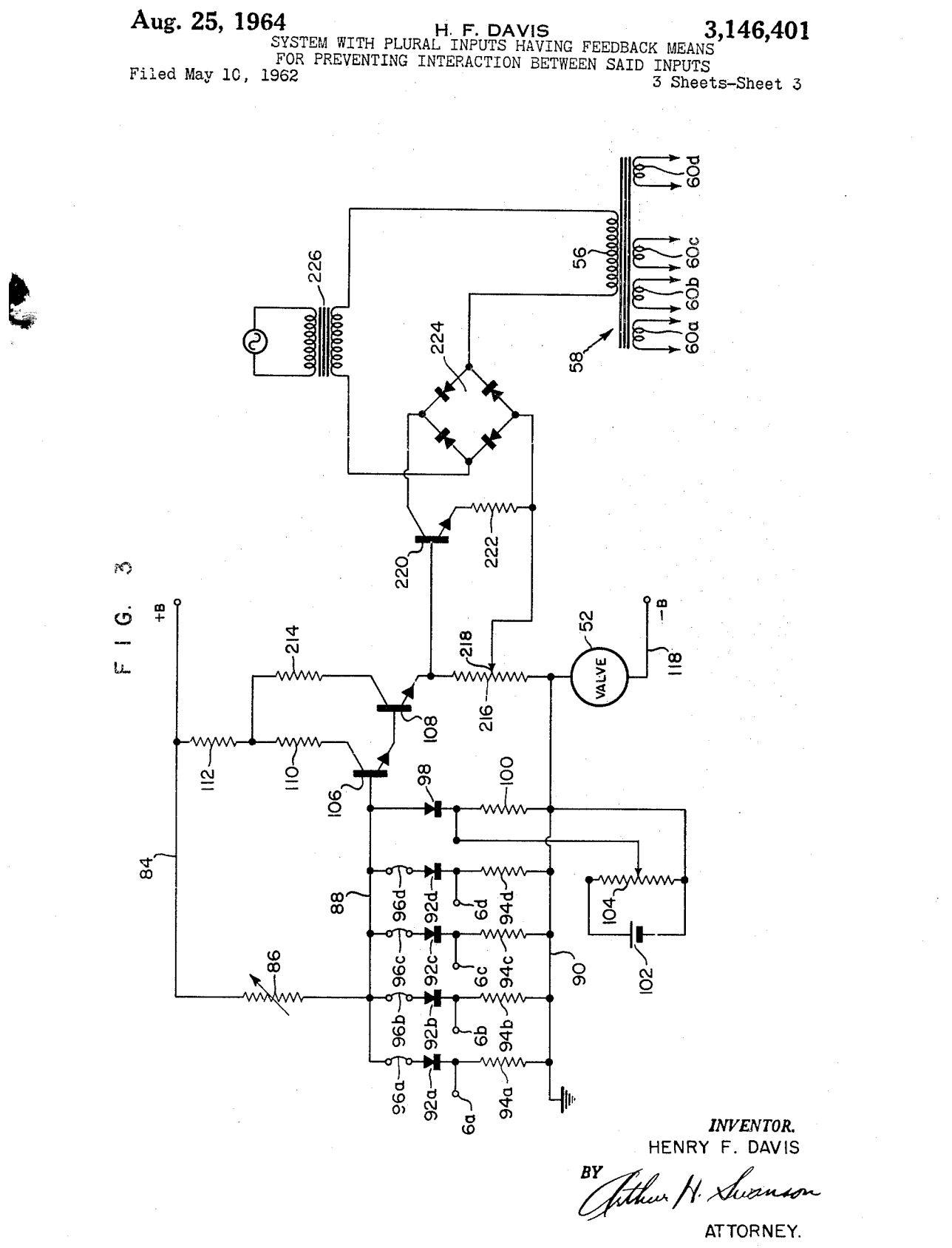

An arrangement similar to that shown in FIG. 2, but featuring an all electronic chopper, is shown in FIG. 3. The signal selector is identical with that shown in FIG. 2. It includes a plurality of input terminals 6a–d connected respectively, to the junctions between a corresponding plurality of diodes 92a–d and resistors 94a–d. The variable resistor 86 connected between the positive voltage line 84 and the first common lead 88 establishes the voltage division as in the structure shown in FIG. 2. The selection of the smallest of the input signals is accomplished in the same manner as in the circuit of FIG. 2. The selected signal is applied to the transistors 106 and 108 for amplification, as before. These transistors control the current flowing from the positive voltage line 84 to the negative voltage line 118 through the utilization device represented by the valve 52. As in FIG. 2, the transistor 106 has its collector connected through a bias resistor 110 and a second resistor 112 to the positive voltage line 84. The collector of the second transistor 108 is connected through a resistor 214 and the resistor 112 to the positive voltage line 84. In the emitter circuit of the second transistor and in series with the utilization device 52, is a slidewire resistor 216. This resistor 216 corresponds to the resistor 116 of FIG. 1 with the exception that the resistor 216 in this figure is shown as a slidewire resistor which together with its associated slider 218 constitutes the signal sampler 50 of FIG. 1. Since all of the controlled current supplied to the utilization device 52 also passes through the resistor 216, a voltage signal is developed across that resistor which is proportional to the controlled current, therefore it is proportional to the selected input signal.

The sampled signal is applied as input signal to the base electrode of a transistor 220, the slider 218 of the slidewire 216 is connected, through a resistor 222 to the emitter of the transistor 220. In the emitter-collector circuit of the transistor 220, there is connected a diode-bridge rectifier 224 with the transistor 220 connected across one diagonal pair of terminals. Across the other pair of terminals of the diode-bridge rectifier there is connected an A.-C. circuit. The A.-C. circuit includes the secondary winding of a transformer 226 and the primary winding 56 of the feedback transformer 58. The primary winding of the transformer 226 is connected to a suitable source of A.-C. excitation. The transformer 58 has, as before, a plurality of secondary windings 60a–d for providing the conductively discrete but substantially identical feedback signals to the several input controllers as shown in FIG. 1.

The transistor 220, the diode-bridge rectifier 224 and the transformer 226 constitute the signal chopper or converter 54 shown in FIG. 1. The A.-C. signals from the transformer 226 are applied to the A.-C. terminals of the rectifier bridge 224. All of the current through the bridge 224 must pass, after rectification, through the transistor 220. The magnitude of the signal passed by the transistor is controlled by the magnitude of the control signal applied to the base electrode thereof. Since the control signal applied to the base of the transistor 220 is proportional to the input signal, the amplitude of the alternating signals in the A.-C. circuit is also proportional to the input signals. This circuit provides the function of chopping the sampled signal without the use of a mechanical interrupter.

From the foregoing description, it may be seen that there has been provided, in accordance with the present invention, an improved control system featuring automatic selection between a plurality of input control signals and which features conductively isolated but substantially identical feedback signals for each of the several input circuits. The isolated feedback feature provides means for preventing conductive interaction between the several input circuits.

What is claimed is:

1. A control system comprising a plurality of signal input means, a signal selector means having a plurality of input terminals each connected to one of said signal input means, said selector means including means responsive to the relative magnitude of the several applied signals for automatically selecting a single one of the input signals to produce a selector output signal corresponding thereto, means responsive to said selector output signal to produce an output control signal, means for sampling said output control signal, converter means connected to said sampling means for converting the sampled signal into an alternating signal of amplitude proportional to the magnitude of said sampled signal, and means responsive to said alternating signals for producing a plurality of discrete but substantially identical feedback signals for corresponding ones of said signal input means.

2. A control system comprising a plurality of signal input means, a signal selector means having a plurality of input terminals each connected to one of said signal input means, said selector means including means responsive to the relative magnitude of the several applied input signals for automatically selecting a single one of the input signals to produce a selector output signal corresponding thereto, means responsive to said selector output signal to produce an output control signal, means for sampling said output control signal, converter means connected to said sampling means for converting the sampled signal into an alternating signal of amplitude proportional to the magnitude of the sampled signal, and means responsive to said alternating signal for producing a plurality of conductively discrete but substantially identical feedback signals for corresponding ones of said signal input means, said alternating signal responsive means including a transformer having a primary winding connected to said converter means and a plurality of separate substantially identical secondary windings.

3. In a control system for controlling an instrumentality in accordance with a selected one of a plurality of input control signals from a corresponding plurality of input signal means, the improvement comprising an input signal selector means including means responsive to the relative magnitude of the several input control signals for automatically selecting one of said input control signals to produce a selector output signal corresponding thereto, means responsive to said selector output signal to produce an output control signal for controlling the instrumentality, means for sampling said output control signal, converter means connected to said sampling means for connecting the sampled signal into an alternating signal of amplitude proportional to the magnitude of the sampled signal, and means responsive to said alternating signal for producing a plurality of conductively discrete but substantially identical feedback signals for the input signal means.

4. In a control system for controlling an instrumentality in accordance with a selected one of a plurality of input control signals from a corresponding plurality of input signal means, the improvement comprising an input signal selector means including means responsive to the relative magnitude of the several input control signals for automatically selecting one of said input control signals to produce a selector output corresponding thereto, means responsive to said selector output signal to produce an output control signal for controlling the instrumentality, means for sampling said output control signal, converter means connected to said sampling means for converting the sampled signal into an alternating signal of amplitude proportional to the magnitude of the sampled signal, and means responsive to said alternating signal for producing a plurality of conductively discrete but substantially identical feedback signals for the input signal means, said alternating signal responsive means including a transformer having a primary winding connected to said converter means and a plurality of substantially identical separate secondary windings.

5. In a control system for controlling an instrumentality in accordance with a selected one of a plurality of input signals from a corresponding plurality of input signal means, the improvement comprising an input signal selector means including means responsive to the relative magnitude of the several input control signals for automatically selecting one of said input control signals to produce a selector output signal corresponding thereto, means including an amplifier responsive to said selector output signal to produce an output control signal for controlling said instrumentality, means for sampling said output control signal, converter means including a mechanical chopper connected to said sampling means for converting the sampled signal into an alternating signal of amplitude proportional to the magnitude of the sampled signal, and transformer means responsive to said alternating signal for producing a plurality of conductively discrete but substantially identical feedback signals for the input signal means, said transformer means including a primary winding connected to said converter means and a plurality of substantially identical separate secondary windings.

6. In a control system for controlling an instrumentality in accordance with a selected one of a plurality of input control signals from a corresponding plurality of input signal means, the improvement comprising an input signal selector means including means responsive to the relative magnitude of the several input control signals for automatically selecting one of said input control signals to produce a selector output signal corresponding thereto, means including an amplifier responsive to said selector output signal to produce an output control signal for controlling said instrumentality, means for sampling said output control signal, converter means including a transistor signal chopper connected to said sampling means for converting the sampled signal into an alternating signal of amplitude proportional to the magnitude of the sampled signal, and transformer means responsive to said alternating signal for producing a plurality of conductively discrete but substantially identical feedback signals for the input signal means, said transformer means including a primary winding connected to converter means and a plurality of substantially identical separate secondary windings.

7. In a control system for controlling an instrumentality in accordance with a selected one of a plurality of input control signals from a corresponding plurality of input signal means, the improvement comprising an input signal selector means including means responsive to the relative magnitude of the several input control signals for automatically selecting one of said input control signals to produce a selector output signal corresponding thereto, means including a transistor amplifier responsive to said selector output signal to produce an output control signal current for controlling said instrumentality, means for sampling said output control signal, converter means connected to said sampling means for converting the sampled signals into an alternating signal of amplitude proportional to the magnitude of the sampled signal, and means responsive to said alternating signal for producing a plurality conductively discrete but substantially identical feedback signals for the input signal means, said alternating signal responsive means including a transformer having a primary winding connected to said converter means and a plurality of substantially identical separate secondary windings.

No references cited.